(12) United States Patent
Lu et al.

(10) Patent No.: US 8,321,924 B2
(45) Date of Patent: Nov. 27, 2012

(54) METHOD FOR PROTECTING SOFTWARE ACCESSIBLE OVER A NETWORK USING A KEY DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 901 days.

(21) Appl. No.: 11/855,643

(22) Filed: Sep. 14, 2007

(65) Prior Publication Data

US 2008/0072297 A1 Mar. 20, 2008

(30) Foreign Application Priority Data

Sep. 20, 2006 (CN) .......................... 2006 1 0113237

(51) Int. Cl.
| | |
|---|---|
| G06F 7/04 | (2006.01) |
| G06F 15/16 | (2006.01) |
| G06F 17/30 | (2006.01) |
| G06F 12/00 | (2006.01) |
| G06F 12/14 | (2006.01) |
| G06F 13/00 | (2006.01) |
| G06F 21/00 | (2006.01) |
| H04L 29/06 | (2006.01) |
| H04L 9/32 | (2006.01) |
| G11C 7/00 | (2006.01) |
| H04N 7/16 | (2011.01) |
| H04N 7/167 | (2011.01) |

(52) U.S. Cl. ......... 726/9; 726/6; 726/7; 726/18; 726/19; 726/21; 726/29; 713/171; 713/172; 713/185; 380/229; 705/55

(58) Field of Classification Search .................. 726/4–5, 726/9, 32, 28–29; 713/171, 185, 183, 172–174; 380/229; 705/55

See application file for complete search history.

(56) References Cited

U.S. PATENT DOCUMENTS

| | | | | |
|---|---|---|---|---|
| 4,634,807 | A * | 1/1987 | Chorley et al. | 705/55 |
| 5,007,089 | A * | 4/1991 | Matyas et al. | 380/280 |
| 5,291,598 | A * | 3/1994 | Grundy | 726/28 |
| 5,754,646 | A * | 5/1998 | Williams et al. | 705/55 |
| 6,189,099 | B1 * | 2/2001 | Rallis et al. | 713/172 |
| 6,216,230 | B1 * | 4/2001 | Rallis et al. | 713/185 |
| 6,243,692 | B1 * | 6/2001 | Floyd et al. | 705/59 |

(Continued)

FOREIGN PATENT DOCUMENTS

EP 1672554 A1 * 6/2006

*Primary Examiner* — Nathan Flynn
*Assistant Examiner* — Carolyn B Kosowski
(74) *Attorney, Agent, or Firm* — Harness, Dickey & Pierce, P.L.C.

(57) ABSTRACT

The present invention provides a method for protecting software based on network, which combines a client program that communicates with a server in C/S (or B/S) architecture with a key device, the client program authenticates a user using the key device for protecting software, the method includes the steps of: running the client program; authenticating the user using the key device by the client program; and continuing to run the client program with a server if the user has passed the authentication. In the prior art, the username and password are easy to intercept in transmission as plain text over network. In the method, the client program is combined with a key device. In addition, the complete client program cannot be executed without involving the server. Therefore, the strength of software protection is increased.

13 Claims, 6 Drawing Sheets

U.S. PATENT DOCUMENTS

| | | | |
|---|---|---|---|
| 6,343,280 B2 * | 1/2002 | Clark | 705/55 |
| 6,523,119 B2 * | 2/2003 | Pavlin et al. | 713/192 |
| 6,832,312 B1 * | 12/2004 | Rochford, II | 713/100 |
| 6,857,067 B2 * | 2/2005 | Edelman | 713/155 |
| 6,904,528 B1 * | 6/2005 | Kawanaka | 726/28 |
| 6,957,199 B1 * | 10/2005 | Fisher | 705/78 |
| 7,024,564 B2 * | 4/2006 | Pavlin et al. | 713/192 |
| 7,032,240 B1 * | 4/2006 | Cronce et al. | 726/2 |
| 7,055,040 B2 * | 5/2006 | Klemba et al. | 713/156 |
| 7,086,052 B2 * | 8/2006 | Mont et al. | 717/177 |
| 7,134,016 B1 * | 11/2006 | Harris | 713/168 |
| 7,181,016 B2 * | 2/2007 | Cross et al. | 380/281 |
| 7,191,344 B2 * | 3/2007 | Lin et al. | 713/193 |
| 7,200,230 B2 * | 4/2007 | Knauft | 380/201 |
| 7,209,559 B2 * | 4/2007 | Rodriguez et al. | 380/228 |
| 7,225,336 B2 * | 5/2007 | Zunke | 713/168 |
| 7,231,526 B2 * | 6/2007 | Hon et al. | 713/185 |
| 7,266,695 B2 * | 9/2007 | Nakayama | 713/172 |
| 7,299,364 B2 * | 11/2007 | Noble et al. | 713/189 |
| 7,353,281 B2 * | 4/2008 | New et al. | 709/229 |
| 7,363,507 B2 * | 4/2008 | Rick | 713/189 |
| 7,376,971 B2 * | 5/2008 | Pastorelli et al. | 726/26 |
| 7,380,125 B2 * | 5/2008 | Di Luoffo et al. | 713/172 |
| 7,434,252 B2 * | 10/2008 | Ballinger et al. | 726/10 |
| 7,454,784 B2 * | 11/2008 | Sahota et al. | 726/9 |
| 7,496,756 B2 * | 2/2009 | Oka et al. | 713/175 |
| 7,512,800 B2 * | 3/2009 | Hopkins | 713/172 |
| 7,610,617 B2 * | 10/2009 | Kelly et al. | 726/5 |
| 7,711,951 B2 * | 5/2010 | Chao | 713/156 |
| 7,712,131 B1 * | 5/2010 | Lethe | 726/20 |
| 7,822,209 B2 * | 10/2010 | Fu et al. | 380/284 |
| 7,854,011 B2 * | 12/2010 | Chen et al. | 726/27 |
| 7,900,246 B1 * | 3/2011 | Xu et al. | 726/9 |
| 8,051,299 B2 * | 11/2011 | Saunier | 713/187 |
| 2002/0174345 A1 * | 11/2002 | Patel | 713/186 |
| 2003/0046189 A1 * | 3/2003 | Asayama | 705/27 |
| 2005/0027997 A1 * | 2/2005 | Ueno et al. | 713/193 |
| 2005/0050352 A1 * | 3/2005 | Narayanaswami et al. | 713/201 |
| 2005/0235363 A1 * | 10/2005 | Hibbard et al. | 726/28 |
| 2006/0137016 A1 * | 6/2006 | Margalit et al. | 726/26 |
| 2006/0222175 A1 * | 10/2006 | Itoh et al. | 380/28 |
| 2006/0280297 A1 * | 12/2006 | Fukaya | 380/28 |
| 2007/0061893 A1 * | 3/2007 | Black et al. | 726/27 |
| 2008/0044017 A1 * | 2/2008 | Nakano et al. | 380/201 |
| 2008/0092239 A1 * | 4/2008 | Sitrick et al. | 726/27 |
| 2008/0109549 A1 * | 5/2008 | Nakagawa et al. | 709/225 |
| 2008/0126810 A1 * | 5/2008 | Chiu | 713/186 |
| 2008/0215468 A1 * | 9/2008 | Monsa-Chermon et al. | 705/34 |

* cited by examiner

METHOD FOR PROTECTING SOFTWARE ACCESSIBLE OVER A NETWORK USING A KEY DEVICE

CROSS-REFERENCE TO RELATED APPLICATION

This application claims priority from Chinese Patent Application No. 200610113237.6, filed on Sep. 20, 2006, entitled "Method for Protecting Software Based on Network", the content of which is incorporated herein by reference in its entirety.

FIELD OF THE INVENTION

The present invention relates to software protection, and more particularly, to a method for protecting software based on network and using a key device.

BACKGROUND OF THE INVENTION

Software protection against piracy has been a big trouble for developers for a long time. For software on an open platform, the piracy problem is even more serious.

The architecture of a software system based on network (e.g. the Internet or Local Area Network) mainly includes C/S architecture (Client/Server architecture) and B/S architecture (Browser/Server architecture). The B/S architecture is derived from the C/S architecture. Virtually, the browser is a client program, which converts an HTML script to a visual interface. The tasks can be allotted properly to the client side (or the browser side) and the server side on demand by making full use of resources on the two sides using the C/S and B/S architecture, thereby the communication overhead of the system is reduced. At present, most application software is of two hierarchy architecture in the form of C/S or B/S.

In the case of the software systems of the C/S or B/S architecture mentioned above, for installers of applications to be deployed on the client (or browser) side, there is no effective protection means or mechanisms to prevent the copyright from being infringed. The installers can be copied and distributed freely. The developers cannot receive the payment they deserve. Also, the security of the applications and data at the server side may be compromised.

A method for protecting software using fingerprint and application apparatus thereof are disclosed in Chinese patent 200310111755.0, wherein the user of software is authenticated via fingerprint verification, and the key code and data of software are protected with a cryptographic SDK module installed on an authentication server.

In addition, a method for protecting software is disclosed in Chinese patent 0211355.0, as well as in 200510109229.X. With the method, the code in compiled program file is divided into two parts, the first part is executed on a cryptographic apparatus, and the second part is executed on a computer.

Presently, a key device is widely used to protect software products. The key device is a small-scale hardware device with a processor and a storage unit. The key device can connect to a computer via its data communications port to control the operation of software and impose restrictions on software features. A private key can be stored within the device, and an encryption algorithm can be preset, later on, a part of algorithm can be customized. When a key device is used in a software product for protection, the device and the product are bound together and the product cannot run properly without the device. The key device provides high security for software by enabling stored private keys invisible to the external, key related operations performed within its range, and physical mechanisms for anti-attack.

For a legacy authentication mechanism on network, the username and password are transferred as plain text over network, which is easy to be intercepted. This problem can be overcome by the asymmetrical key system and the challenge/response mechanism. The asymmetrical key system is a widespread authentication system, in which the encryption key is different from the decryption key. Digital signature of PKI (Public Key Infrastructure) ensures both the confidentiality and non-repudiation of information, by first signing the plain text with a private key from the authenticated party to generate a digital signature, and then sending the digital signature to an authenticator who will decrypt it with the public key from the authenticated party, and finally comparing the decrypted digital signature with the original text for authentication.

HMAC-Hash is a regular challenge/response authentication means and enhances the Hash algorithm. The Hash algorithm is a unidirectional encryption algorithm without involving a key. It can be used for encrypting data of any size and producing cipher text data of fixed size. HMAC (keyed-Hashing Message Authentication Code) combines a key with the Hash operation, with a random number involved in each operation, to produce different resulting data for each authentication. Therefore, even if authentication data is intercepted, it cannot be used for the next authentication. Also, the key is not transmitted over the network. As a result, a higher security authentication means is provided, which completely avoids disclosure of a key.

SUMMARY OF THE INVENTION

The present invention provides a method for protecting software based on network, which combines a client program that communicates by network with a server in C/S (or B/S) architecture with a key device. The client program is in connection with the server by means of network communication. The client program authenticates a user using a key device and communicates with the server for protecting software. In this way, it is more difficult to crack the software, because no username and/or password have ever been transmitted over network.

The method includes the steps of:
1) Running a client program;
2) Authenticating a user using a key device by the client program;
3) Continuing to run the client program with a server if the user has passed the authentication.

The client program is a complete program or a processed client program. The processed client program requires the response of the specific service from the server; or the processed client program requires specific data provided by the server; or the processed client program is an incomplete program lack of a part of code, when the lacked part of code is needed at runtime of the client program, the server is required to respond with the lacked part of code; or any combination of the above.

In the method, the authenticating a user using a key device is to perform the authentication using the username and PIN, or to perform the authentication based on the PKI, or to perform the authentication by means of challenge/response authentication.

In the method above, the client program requiring the response of the specific service from the server is that the client program sends a request for service to the server when it requires the server to provide specific service at runtime, and the server will then return a service result that is transmitted in encrypted format to the client program.

In the method above, the client program requiring specific data provided by the server is that the client program sends a request for the data to the server when it requires the server to provide the data at runtime, and the server will then returns the data that is transmitted in encrypted format to the client program.

In the method above, in the case that the client program is lack of a part of code, the client program sends a request to the server for downloading the part of code when the part of code is needed at runtime, and the server then responds with the part of code that is transmitted in encrypted format to the client program.

Compared with the prior art, the method for protecting software provided in the present invention is advantageous in that the method uses a key device for software protection. The key device is a secure information carrier capable of preventing tampering and theft of internal information. A private key is operated inside the device to avoid duplicates and attacks. In addition, when the client program is an incomplete program, the involvement of the server is necessary when it is executed. As a result, it is more difficult to crack the software.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

In view of the disadvantages in the prior art, the present invention provides a method for protecting software based on network, which combines a client program that communicates by network with a server in C/S (or B/S) architecture with a key device. The client program is in connection with the server by means of network communication. The client program authenticates a user using a key device and communicates with the server for protecting software. In this way, it is more difficult to crack the software, because no username and/or password have ever been transmitted over network. The method includes the steps of:
1) Running a client program;
2) Authenticating a user using a key device by the client program;
3) Continuing to run the client program with a server if the user has passed the authentication.

The client program is a complete program or a processed client program. The processed client program requires the response of the specific service from the server; or the processed client program requires specific data provided by the server; or the processed client program is an incomplete program lack of a part of code, when the lacked part of code is needed at runtime of the client program, the server is required to respond with the lacked part of code; or any combination of the above.

The specific service may be one or more key functions necessary for operation of the client program. When one of these functions is needed at runtime, the client program sends a request to the server, which will then run the function corresponding to the client and return the result to the client program. Here, the term "service" is used to represent all similar cases of parts of a program (software), including the function.

The specific data is the data related to the client program running that is accessed at runtime of the client program. Take example for a patent query software, in the case that a user wants to view details of a patent, the details of the patent can viewed by the user only if the details are sent by a server to the client side. These details are of one kind of the foregoing specific data.

The present invention is further described with the embodiments and the drawings below.

However, the description is not intended to limit the present invention.

For the purpose of description, the occurrences of "the client program" below generally refer to the client program of the C/S architecture and the browser program of the B/S architecture.

When selling a client program to users, the seller produces a key pair (a public key and a private key) for each user, and the key pair corresponds to, for example, the serial number of the client program (typically, the key pair corresponds to a unique identifier of a user). The public key is stored on the server. The private key is stored on a key device, which is provided to the user.

The client side may be authenticated by the server in various manners. Three preferred embodiments of the present invention will be described now.

Figure 1:
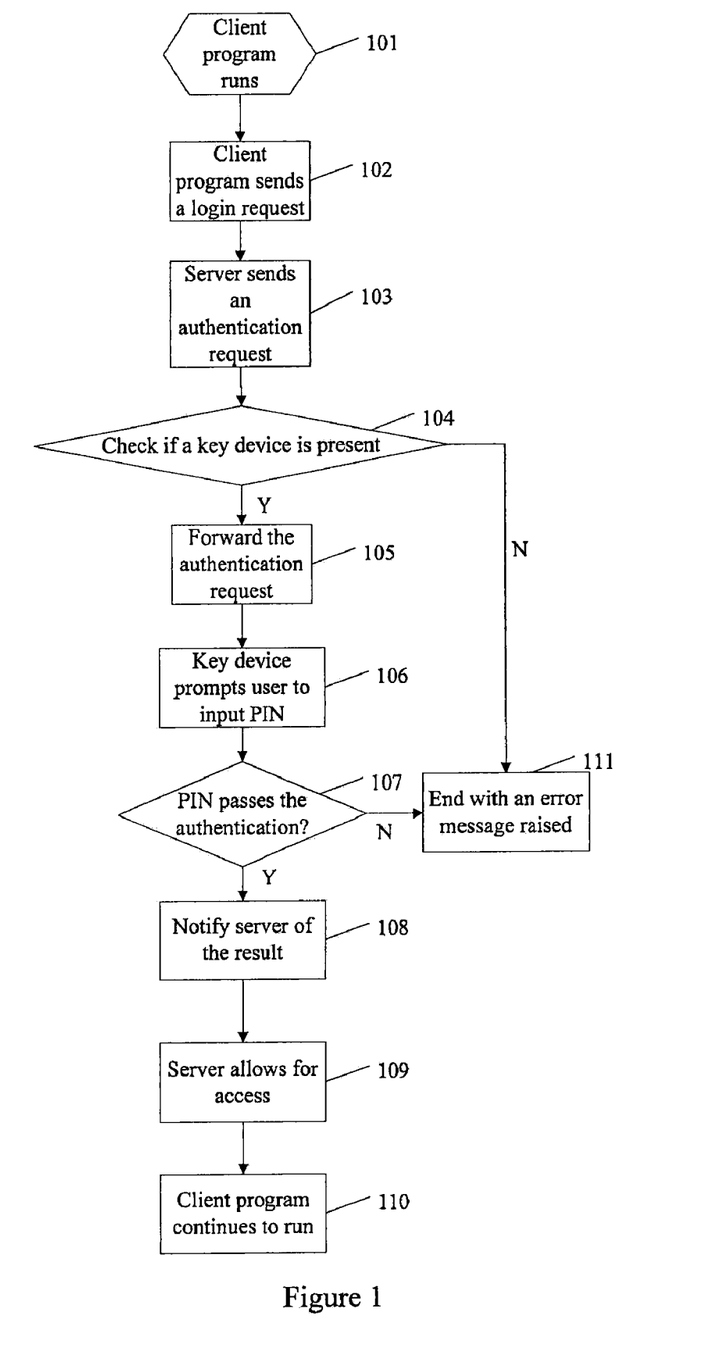
FIG. 1 is a flow diagram of authentication by a first authentication means.

In a first manner, PIN (Personal Identification Number) is used for authenticating a user. Referring to FIG. 1, an authentication procedure is performed as follows:

At step 101, a client program runs;

At step 102, the client program first sends a login request to the server;

At step 103, the server sends an authentication request to the client side;

At step 104, the client program checks if a key device is present; if the key device is not present, an error message is then raised and the procedure is ended as shown at step 111; otherwise, the procedure advances to step 105;

At step 105, the client program forwards the authentication request to the key device;

At step 106, the key device requires the user to input a PIN;

At step 107, the key device verifies the PIN input by the user, and if the PIN is incorrect, an error message is then raised and the procedure is ended as shown at step 111; otherwise, the procedure advances to step 108;

At step 108, the key device notifies the server via the client program of the fact that the user has passed the authentication;

At step 109, after receiving the notification, the server allows the client program to access the data and resources of it;

At step 110, the client program continues to run;

At step 111, an error message is raised and the procedure is ended.

Figure 2:
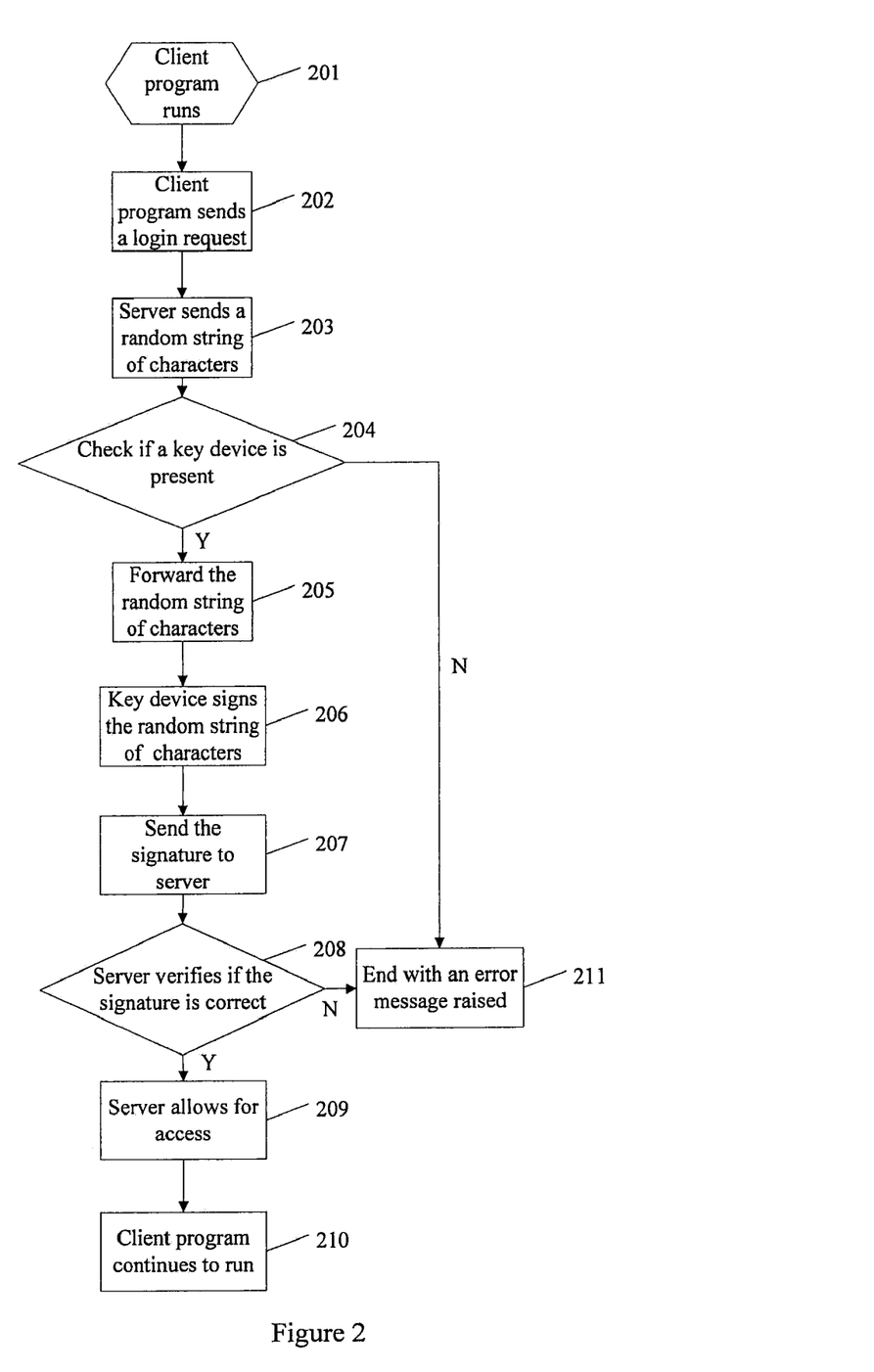
FIG. 2 is a flow diagram of authentication by a second authentication means.

In a second manner, PKI (Public Key Infrastructure) mechanism is used for authenticating a user. Referring to FIG. 2, an authentication procedure is performed as follows:

At step 201, a client program runs;

At step 202, the client program first sends a login request to the server;

At step 203, the server sends an authentication request to the client side (i.e. a random string of characters to the client program);

At step 204, the client program checks if a key device is present; if the key device is not present, an error message is then raised and the procedure is ended as shown at step 211; otherwise, the procedure advances to step 205;

At step 205, the client program forwards the random string of characters to the key device;

At step 206, the key device signs the random string of characters with an algorithm and a private key stored within it;

At step 207, the key device sends the signature to the server via the client program;

At step 208, the server verifies the signature using a public key corresponding to the client program, and if the verification is failed, an error message is raised and the procedure is ended as shown at step 211; otherwise, the procedure advances to step 209;

At step 209, the server allows the client program to access the data and resources of it;

At step 210, the client program continues to run;

At step 211, an error message is raised and the procedure is ended.

Figure 3:
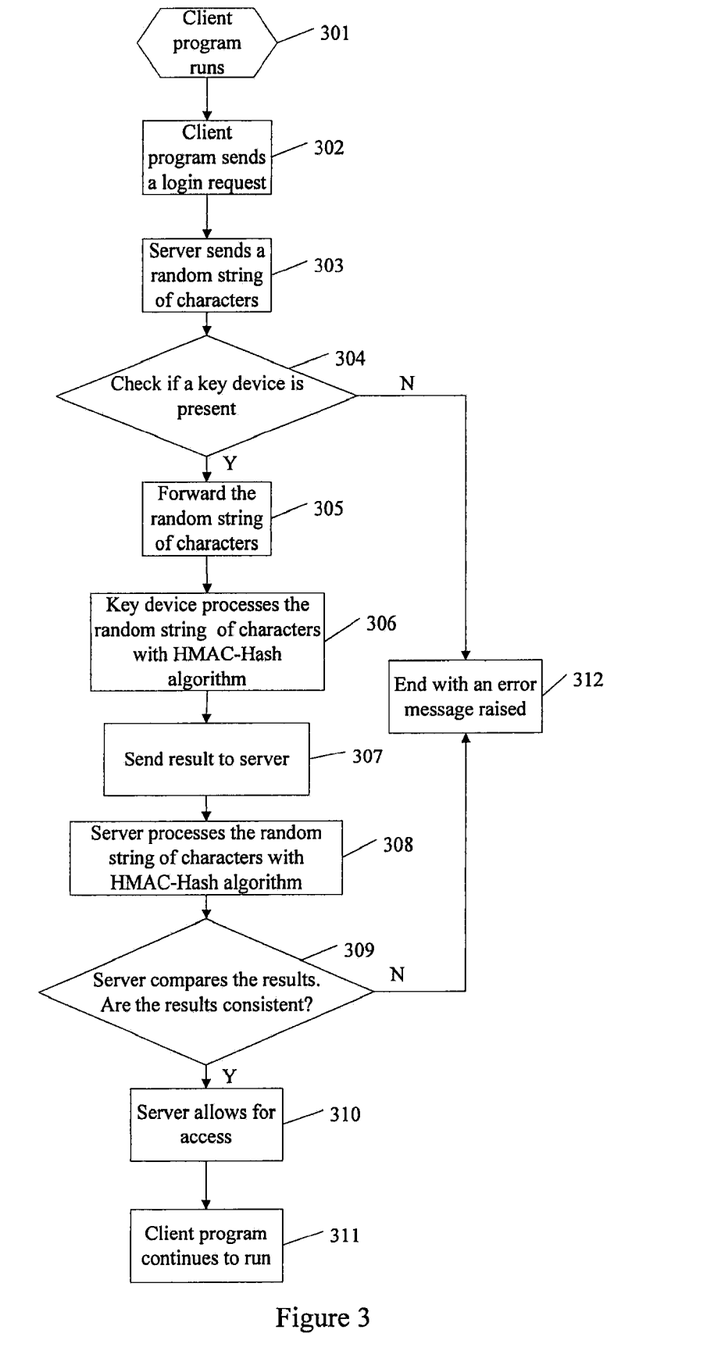
FIG. 3 is a flow diagram of authentication by a third authentication means.

In a third manner, the challenge/response mechanism is used for authenticating a user. To authenticate a user in this manner, a HMAC-Hash algorithm and a symmetrical key is required be preset in the server and the key device. Referring to FIG. 3, an authentication procedure is performed as follows:

At step 301, a client program runs;

At step 302, the client program first sends a login request to the server;

At step 303, the server sends an authentication request to the client side (i.e. a random string of characters to the client program);

At step 304, the client program checks if a key device is present; if the key device is not present, an error message is then raised and the procedure is ended as shown at step 312; otherwise, the procedure advances to step 305;

At step 305, the client program forwards the random string of characters to the key device;

At step 306, the key device processes the random string of characters using the preset key and HMAC-Hash algorithm to obtain a client result;

At step 307, the key device returns the client result to the server via the client program;

At step 308, after receiving the client result, the server processes the foregoing random string of characters using a key corresponding to the client side and the HMAC-Hash algorithm to obtain a server result;

At step 309, a server program compares the client result with the server result, and if the two results are not consistent, an error message is raised and the procedure is ended as shown at step 312; otherwise, the procedure advances to step 310;

At step 310, the server allows the client program to access the data and resources of it;

At step 311, the client program continues to run;

At step 312, an error message is raised and the procedure is ended.

The foregoing three authentication manners can be used in combination. Therefore, the security of the client program could be further increased.

After a user has passed the above authentication, the client program will continue to run. The operation of the client program requires the response of the specific service, specific data, or the lacked code for the client program from the server.

Figure 4:
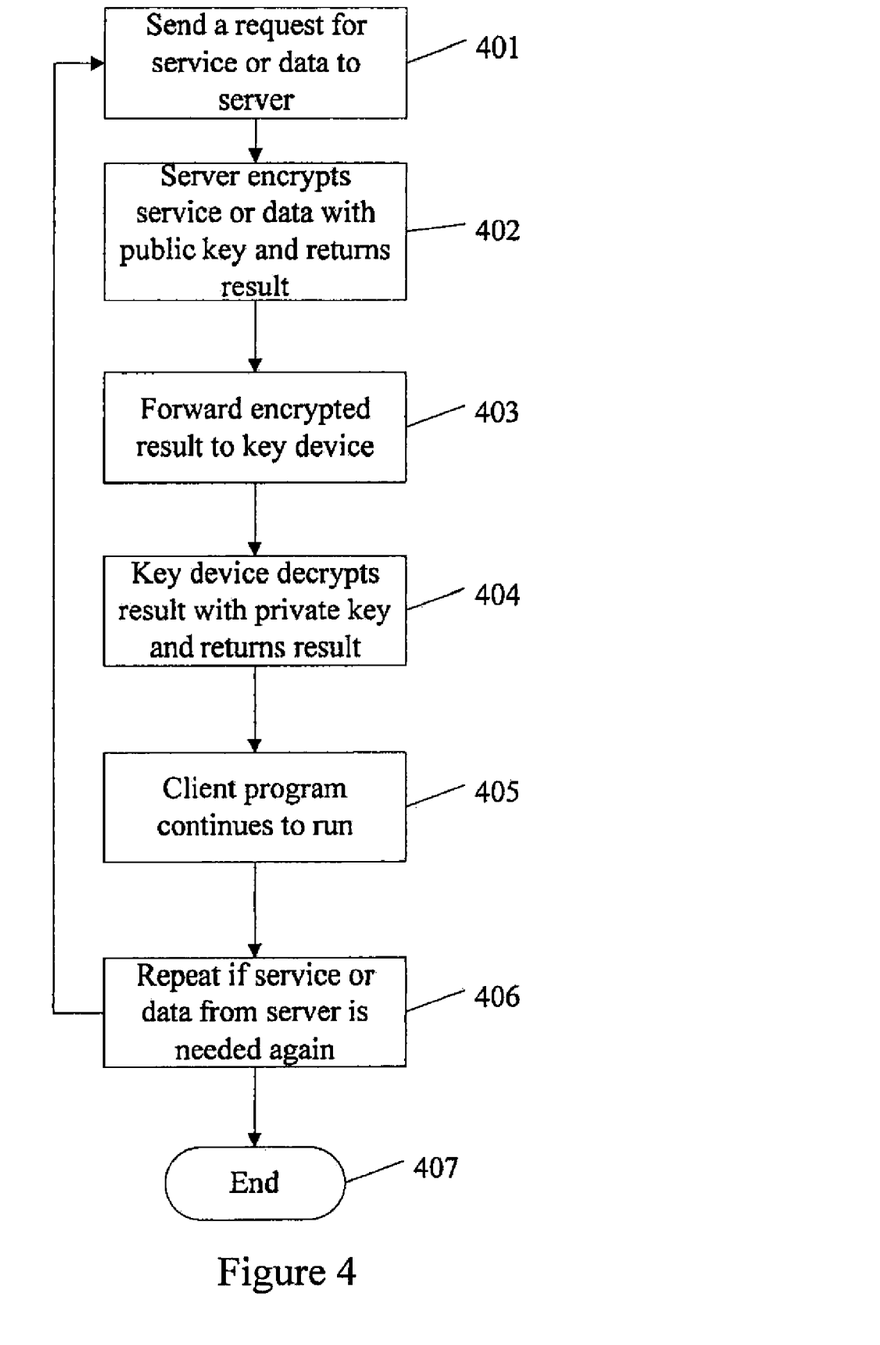
FIG. 4 is a flow diagram of operations in the case that the client program requires specific service or data provided by the server.

The case where the client program requires data or the response of the specific service from the server is first described, as shown in FIG. 4:

At step 401, if the data or the response of the specific service from the server is needed, the client program sends a request for it to the server;

At step 402, the server responds to that request, and returns a result of service operation or the data after encrypting it using a public key corresponding to the client program to the client program;

At step 403, the client program forwards the encrypted result or data to the key device;

At step 404, the key device decrypts the encrypted result or data using its private key, and returns the decrypted result or data to the client program;

At step 405, the client program continues to run with the returned result or data;

At step 406, if the response of the specific service or data from the server is needed again, the steps 401~405 are repeated;

At step 407, the procedure is ended.

Figure 5:
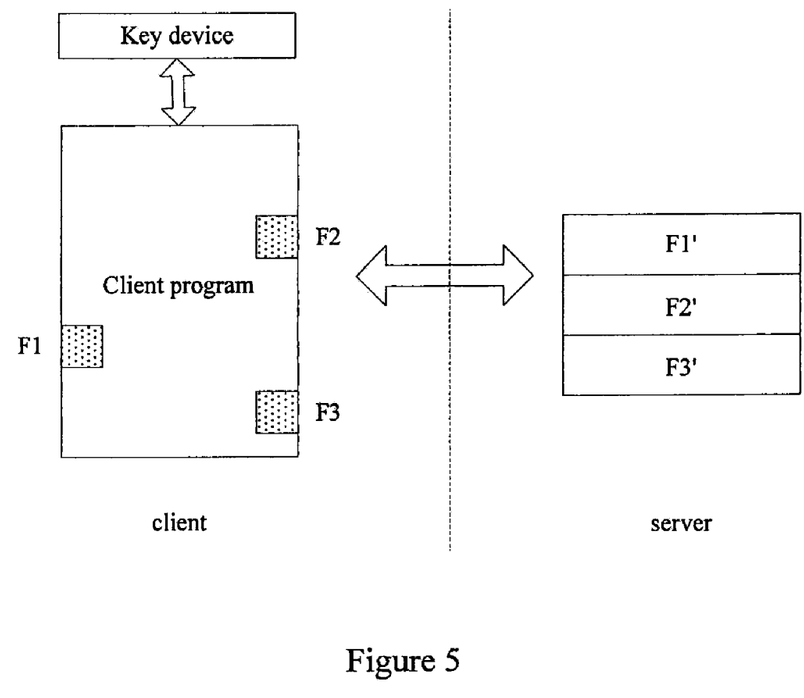
FIG. 5 is a schematic diagram of software system in the case that the client program is lack of a part of code.

The case where a client program is lack of a part of code and a server is required to provide the lacked part of code is now described. As shown in FIG. 5, the client program is incomplete after being handled and is lack of a part of code F (e.g., F1, F2 and F3 of the client side in FIG. 5 are locations for the lacked part of code), the portions of the lacked code are filled with appropriate goto statements. The lacked code of the client program is stored at a server (e.g., at F1', F2' and F3' of the server in FIG. 5) after being encrypted with a public key corresponding to the client program.

Figure 6:
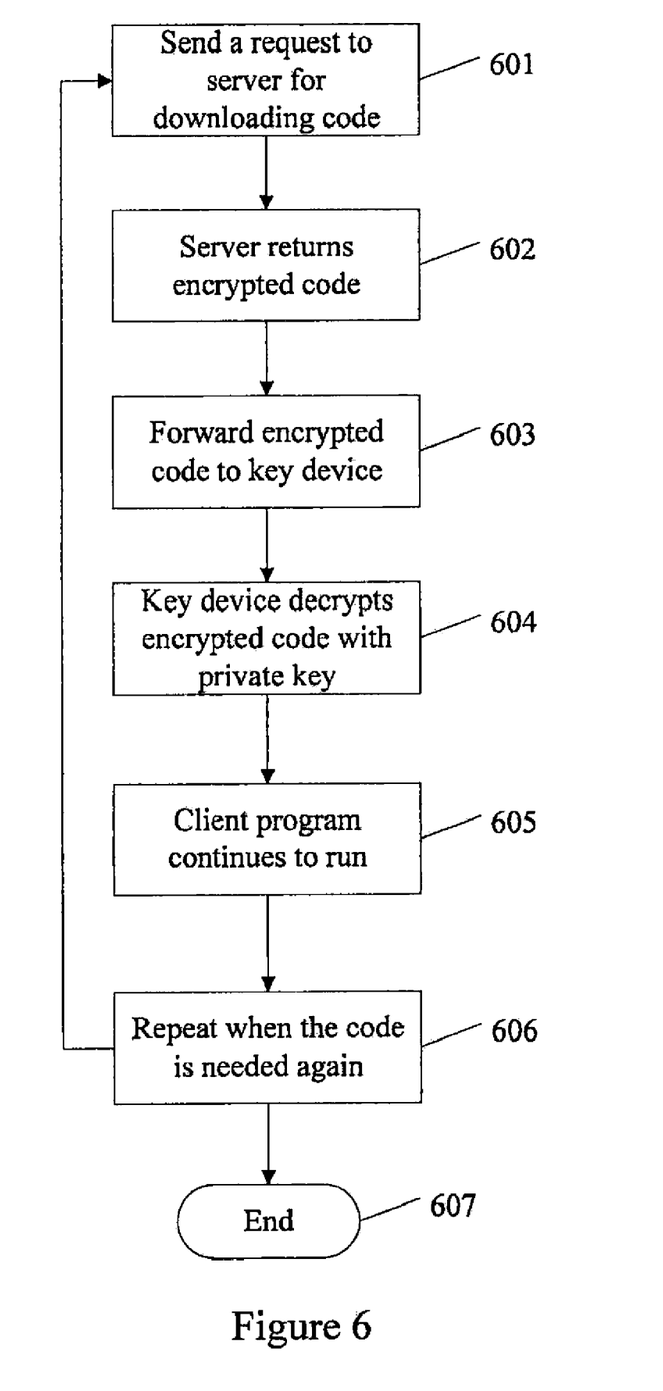
FIG. 6 is a flow diagram of operations in the case that the client program needs to download the lacked part of code from the server.

Referring to FIG. 6, the procedure in resuming the client program is as follows:

The client program continues to run after passing the above authentication of the server;

At step 601, when the lacked code (the extracted parts) is needed at runtime, the client program sends a request to the server for downloading the code;

At step 602, the server responds to that request, and sends the cipher text of the code to the client program;

At step 603, the client program forwards the code of the cipher text to the key device;

At step 604, the key device decrypts the code of the cipher text using a private key into plain text code and return it to the client program;

At step 605, the client program continues to run with the code that has been received;

At step 606, if the lacked code from the server is needed again at the runtime of the client program, the steps 601-605 will be repeated;

At step 607, the procedure is ended.

It will be appreciated by those of ordinary skill in the art that the invention can be embodied in other specific forms without departing from the spirit or essential features thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method comprising:
   running a client program, wherein the client program lacks a part of code, and wherein the part of code is encrypted and stored on a server;
   authenticating a user using a key device by the client program;
   sending a request from the client program to the server for downloading the part of code via a network if the user passed the authentication;
   receiving the part of code from the server via the network by the client program;
   forwarding the part of code to the key device by the client program;
   decrypting the part of code by the key device;
   returning the decrypted part of code from the key device to the client program; and
   continuing to run the client program using the decrypted part of code.

2. The method of claim 1, wherein authenticating a user using the key device includes performing authentication using a username and PIN, or performing the authentication by a Public Key Infrastructure (PKI), or performing the authentication by challenge/response authentication.

3. The method of claim 1, wherein when the client program requires a response of a specific service from the server, the client program sends a request for the specific service to the server for requiring the server to provide the specific service at runtime, and the server returns a service result to the client program.

4. The method of claim 3, wherein the service result is transmitted in encrypted format.

5. The method of claim 1, wherein the client program sends a request to the server for downloading the part of code which is needed at runtime.

6. The method of claim 1, wherein when the server responds with the part of code, the server sends cipher text of the part of code to the client program, the cipher text of the part of code is sent to the key device and is decrypted by the key device into plain text codes, and the client program continues to run with the plain text codes.

7. The method of claim 1, wherein for continuing communication with the server, the client program requires at least one of: a response of a specific service from the server; and specific data provided by the server.

8. The method of claim 7, wherein when the client program requires specific data provided by the server, the client program sends a request for the specific data to the server for requiring the server to provide the specific data at runtime, and the server returns the specific data to the client program.

9. The method of claim 8, wherein the data returned is transmitted in encrypted format.

10. The method of claim 1, wherein the client program lacks of at least one function necessary for operation of the client program, and when the function is needed at runtime, the client program requests the server to run the function and to return a result generated by the function to the client program.

11. The method of claim 1, further comprising communicating with the server using the client program in a client/server architecture or a browser/server architecture.

12. The method of claim 1, further comprising decrypting the part of code using a private key by the key device, wherein the private key is stored in the key device, wherein the private key is paired with a public key stored on the server.

13. The method of claim 12, wherein the private key and the public key correspond to a unique identifier of the client program or the user.

* * * * *